(12) United States Patent
Roychoudhury et al.

(10) Patent No.: US 8,795,398 B2
(45) Date of Patent: Aug. 5, 2014

(54) APPARATUS FOR VAPORIZING AND REFORMING LIQUID FUELS

(75) Inventors: Subir Roychoudhury, Madison, CT (US); Maxim Lyubovsky, Fairfax, VA (US); Jonathan D. Berry, Simpsonville, SC (US)

(73) Assignee: Precision Combustion, Inc., North Haven, CT (US)

( * ) Notice: Subject to any disclaimer, the term of this patent is extended or adjusted under 35 U.S.C. 154(b) by 691 days.

(21) Appl. No.: 13/134,268

(22) Filed: Jun. 3, 2011

(65) Prior Publication Data
US 2011/0296759 A1 Dec. 8, 2011

Related U.S. Application Data

(63) Continuation-in-part of application No. 11/974,988, filed on Oct. 16, 2007, now Pat. No. 7,976,594, which is a continuation-in-part of application No. 10/902,512, filed on Jul. 29, 2004, now abandoned.

(60) Provisional application No. 60/491,604, filed on Jul. 31, 2003.

(51) Int. Cl.
*B01J 7/00* (2006.01)

(52) U.S. Cl.
USPC .......................................................... 48/61

(58) Field of Classification Search
CPC .............. C01B 2203/1276; C01B 3/36; C01B 2203/085; C01B 2203/1005; B01J 19/26; B01J 8/0214; B01J 8/0221; B01J 4/002; B01J 8/0465
See application file for complete search history.

(56) References Cited

U.S. PATENT DOCUMENTS

| | | | |
|---|---|---|---|
| 3,978,836 A | 9/1976 | Noguchi et al. | |
| 4,255,121 A | 3/1981 | Sugimoto | |
| 4,345,555 A * | 8/1982 | Oshima et al. | 123/272 |
| 4,381,187 A | 4/1983 | Sederquist | |
| 5,051,241 A | 9/1991 | Pfefferle | |
| 5,146,881 A * | 9/1992 | Pfefferle | 123/145 A |
| 5,593,607 A * | 1/1997 | Dam et al. | 219/270 |
| 5,725,151 A | 3/1998 | Hetrick et al. | |
| 6,284,398 B1 | 9/2001 | Kiryu | |
| 6,491,236 B1 | 12/2002 | Keller | |
| 6,641,625 B1 | 11/2003 | Clawson et al. | |
| 6,746,657 B2 | 6/2004 | Castaldi | |
| 6,767,518 B2 | 7/2004 | Ichikawa et al. | |
| 6,783,742 B2 | 8/2004 | Bentley et al. | |

(Continued)

FOREIGN PATENT DOCUMENTS

WO  WO 2004060546 A2  7/2004

*Primary Examiner* — Imran Akram
(74) *Attorney, Agent, or Firm* — Marie F. Zuckerman (57) ABSTRACT

The present invention is an apparatus for the gasification of liquid fuels, involving: (a) a nozzle for atomizing and feeding a liquid fuel into a mixing region; (b) an inlet for feeding an oxidizer into the mixing region; (c) the mixing region for mixing the atomized fuel with the oxidizer; (d) a radiation hot box for vaporizing the liquid fuel, the radiation hot box comprising an ignition source positioned inside coiled catalytic reactor; (e) the coiled catalytic reactor comprising a coiled metal screen providing for a radial flow path from an inner diameter to an outer diameter of the coiled metal screen and providing for a plurality of void volumes in random order along the flow path from the inner diameter to the outer diameter; and (f) an outlet for exiting a gaseous reformate.

6 Claims, 5 Drawing Sheets

(56) References Cited

U.S. PATENT DOCUMENTS

| | | |
|---|---|---|
| 6,869,456 B2 | 3/2005 | Salemi et al. |
| 7,156,886 B2 | 1/2007 | Nakamura et al. |
| 2003/0154654 A1 | 8/2003 | Goebel |
| 2004/0209205 A1 | 10/2004 | Gomez |
| 2005/0028445 A1 | 2/2005 | Lyubovsky et al. |
| 2005/0081444 A1 | 4/2005 | Anumakonda et al. |
| 2007/0084118 A1 | 4/2007 | Kaeding et al. |
| 2007/0151154 A1 | 7/2007 | Lyubovsky |
| 2008/0127553 A1 | 6/2008 | Roychoudhury |
| 2009/0113889 A1 | 5/2009 | Roychoudhury |
| 2009/0252661 A1 | 10/2009 | Roychoudhury et al. |
| 2009/0293358 A1 | 12/2009 | Roychoudhury et al. |
| 2010/0126165 A1 | 5/2010 | Roychoudhury et al. |
| 2011/0146264 A1 | 6/2011 | Roychoudhury et al. |
| 2011/0165300 A1 | 7/2011 | Roychoudhury et al. |

* cited by examiner

APPARATUS FOR VAPORIZING AND REFORMING LIQUID FUELS

CROSS-REFERENCE TO RELATED APPLICATIONS

This application is a continuation-in-part of U.S. patent application Ser. No. 11/974,988, filed Oct. 16, 2007 now U.S. Pat. No. 7,976,594, which is a continuation in part of U.S. patent application Ser. No. 10/902,512, filed Jul. 29, 2004, now abandoned, which claims the benefit of U.S. Provisional Application No. 60/491,604, filed Jul. 31, 2003.

FIELD OF THE INVENTION

The present invention is directed to a gasification system (alternatively, "apparatus" or "catalytic reformer") for vaporizing and reforming a liquid fuel, such as diesel fuel. More particularly, the apparatus is designed for vaporization and reforming of a liquid fuel to form a partially-oxidized gaseous reformate, preferably, a mixture of hydrogen and carbon monoxide. Hereinafter, the apparatus is referred to as a "reformer" or as a "gasifier" or as a "pre-reformer." The terms "reformer" and "gasifier" are applicable in equivalent situations wherein a fuel is converted into a gaseous reformate that is intended to be used downstream as a higher value fuel for combustors or fuel cells. The term "pre-reformer" is applicable in situations wherein a fuel is conditioned or cleaned-up before being fed into a primary fuel reformer. Conditioning and/or clean-up may involve pre-reforming a fuel to remove sulfur compounds or undesirable hydrocarbon compounds. As used herein, the terms "reforming" and "gasification" refer to the process of converting a liquid fuel into a gaseous reformate product.

BACKGROUND OF THE INVENTION

Vaporization of liquid fuels (e.g., hydrocarbons, alcohols) typically is achieved by indirectly supplying heat into a stream of liquid fuel via heat exchange with a hot wall. One disadvantage of this method is that the rate of vaporization is limited by the rate of heat transfer such that a relatively large surface area is required for fuel vaporization. Another disadvantage of this method, especially for vaporizing long chain hydrocarbons, is that heating the fuel stream to a vaporization temperature tends to cause fuel decomposition and formation of deposits. More specifically, coke formation is problematic. Moreover, preventing deposits from forming within fuel passages in a nozzle used for fuel delivery to a reformer is challenging.

Another known method for gasification of a fuel stream comprises mixing atomized fuel with a hot gas such as superheated steam that supplies the heat required for fuel vaporization and prevents coke formation. However, large amounts of superheated steam required in this method result in a large heat load for steam production.

Spray methods for atomization of liquid fuels, as known in the art, include air-blast or pressure atomizers, ultrasonic and electrospray atomizers. These spray systems are capable of providing a uniform distribution of atomized fuel across the entrance of a catalyst bed in a reformer. Such atomizers may include a co-flow of air that allows mixing of the fuel and oxidizer. However, very fine and uniform droplet size along with homogeneous fuel-air distribution, required to avoid coke formation and obtain temperature/mixture uniformity in the reformer, is difficult to achieve in practical reforming systems.

Ignition devices, such as metal spark or glow plugs, are widely used to ignite fuel-oxidizer mixtures at startup. By virtue of their location required for ignition, these devices are often subject to failure due to the reformer's high operating temperatures.

Monoliths are commonly used as catalyst substrates for the gasification of liquid fuel. Inhomogeneities in a fuel-oxidizer mixture are usually detrimental to monolith substrates, because inhomogeneities can lead to localized lean or rich zones causing hot spots or carbon precipitation regions, respectively. Little opportunity exists for these zones to remix within the monolith, because monolith substrates generally have long separated channels. Thus, monolith substrates are particularly vulnerable. In addition, carbon precipitation is favored in monoliths due to boundary layers that develop in these substrates on contact with the fuel oxidizer mixture.

Vaporization of liquid fuels poses significant problems, especially for fuels with high aromatic content and wide boiling point distribution. This can be attributed to the propensity of the heavier aromatic compounds in the fuel to form deposits or coke when vaporized at high temperatures. Accordingly, there is a need for a reforming or pre-reforming reactor capable of operating with a range of liquid fuels.

U.S. Pat. No. 4,381,187 to Sederquist (the "'187 Patent") discloses a method in which a partially pre-vaporized fuel stream, mixed with air at an overall equivalence ratio greater than 3, is passed through a monolith catalytic structure thereby achieving gasification of the fuel in the stream. The '187 Patent requires mixing the fuel stream with a heated air stream and partial vaporization of the fuel prior to its introduction into the catalyst bed. Air temperature specified for the method is between 580° C. and 660° C. At these temperatures, coking may occur. The method of the '187 Patent requires supplying external heat for pre-heating the air. The method of the '187 Patent also requires the catalyst to be in a shape having wall surfaces extending in a downstream direction defining a plurality of parallel cells, for example, a conventional monolith. This configuration results in a comparatively low conversion rate of the reactants to the desired products. Moreover, in the method of the '187 Patent, the catalyst is chosen such as to initiate and sustain complete combustion, namely oxidation of part of the fuel to $CO_2$ and $H_2O$ releasing heat. The '187 Patent discloses at column 1, line 49, that "once in vaporous form, fuel may be catalytically partially oxidized and reformed in an autothermal catalytic reactor." Therefore, a separate reactor is required if a $H_2$-rich gas stream is desired.

U.S. Pat. No. 4,255,121 to Sugimoto (hereinafter the '121 Patent) discloses a fuel reformer wherein a liquid fuel, oxidizer, e.g. air, and water are fed through a nozzle and atomized into one end of a cylindrical chamber containing a catalyst in the form of solid metal fins. A heating element wrapped around an exterior wall of the chamber provides an external source of heat at the nozzle for vaporization of the liquid fuel. A partially oxidized reformate exits in axial flow from the opposite end of the cylindrical chamber, where the reformate is ignited in a flame combustion. Disadvantageously, this process requires a source of external heat at the nozzle to vaporize the liquid fuel; thus the fuel is prone to coking at the nozzle. Moreover, the solid finned metal catalyst is not designed for thorough mixing. Additionally, axial flow is not commensurate with satisfactory temperature control or maximization of hydrogen product.

U.S. Pat. No. 3,978,836 to Noguchi et al. (hereinafter the '836 Patent) discloses a mixture heating unit for an internal combustion engine for the purpose of atomizing and vaporizing a fuel, so as to facilitate uniformity of distribution of a fuel mixture and to minimize emission of unburned gases. The heating unit features a heating element comprising a porous wick. The wick is wetted with fuel, and a resulting combination of vaporized fuel and air is ignited by a glow plug or spark plug. The resulting combustion flame ignites and activates a downstream catalyst layer to burn the mixture, which flows into an intake manifold of the engine.

In view of the above, it is therefore an object of the current invention to provide a reformer or pre-reforming reactor for partially oxidizing and cracking heavy components of a liquid fuel. It also is an object of the current invention to provide a catalytic reactor for the gasification of liquid fuels that yields partial oxidation products, specifically, carbon monoxide (CO) and hydrogen ($H_2$). It is a further object of the current invention to provide a method and apparatus whereby steam or atomized water and/or carbon dioxide ($CO_2$) may be added to the fuel/air stream to adjust the amount of hydrogen in the product stream. It is also an object of the current invention to provide a catalyst substrate that facilitates mixing of the stream flowing therethrough. It also is a further object of the current invention to provide a method and apparatus whereby the liquid fuel is vaporized without pre-heating by external means the fuel and air feeds.

The dependence of fuel conversion on an oxygen-to-carbon ratio (O:C) is known to one skilled in the relevant art. For the purposes of this invention, the term "O:C ratio" is defined as the number of oxygen atoms in the oxidizer divided by the number of carbon atoms in the liquid fuel, as fed to the reformer or pre-reformer. Tests of a conventional gasifier comprising a catalytic reactor and an inlet for prevaporized, premixed fuel and air indicated a linear increase in fuel conversion with increasing air. With increased air, or a higher O:C ratio, the catalyst temperature increased and higher fuel conversion was achieved, though at the expense of higher heat release and higher catalyst temperatures. It thus is a further object of the current invention to provide a method whereby gasification of liquid fuels is achieved by employing a fuel-rich fuel air mixture with an O:C ratio more suitable for efficient fuel conversion.

SUMMARY OF THE INVENTION

This invention provides an apparatus for vaporizing and reforming a liquid fuel, comprising:
(a) a nozzle for atomizing and feeding a liquid fuel into a mixing region;
(b) an inlet for feeding an oxidizer into the mixing region;
(c) the mixing region positioned in fluid communication with the nozzle and the inlet for feeding the oxidizer, the mixing region mixing the atomized fuel with the oxidizer;
(d) a radiation hot box for vaporizing the liquid fuel, the radiation hot box being positioned in fluid communication with the mixing region and comprising an ignition source positioned inside a coiled catalytic reactor;
(e) the coiled catalytic reactor comprising a coiled metal screen providing for a radial flow path from an inner diameter to an outer diameter of the coiled metal screen and providing for a plurality of void volumes in random order along the flow path from the inner diameter to the outer diameter; and
(f) an outlet in fluid communication with the coiled catalytic reactor for exiting a gaseous reformate.

The present invention is directed to a system and method for vaporizing and reactively converting a liquid fuel into a gasified stream. The method and system of the present invention also provide a means for quickly starting and operating the process at a variety of inlet conditions, including ambient inlet conditions. More particularly, the method includes the steps of atomizing a liquid fuel, mixing the atomized fuel with an oxidizer, preferably, in fuel rich proportions, partially vaporizing the fuel, and passing the resulting stream through a coiled catalytic reactor (also referred to herein as "the catalyst bed") comprising a coiled metal screen to provide for reforming of the fuel. The catalyst bed is preferably designed for supporting partial oxidation/reforming reactions, preferably at high space velocity, and is integrated with an ignition source to provide for fuel vaporization and ignition of the reforming reaction. The apparatus results in an integrated system comprised of a mixer, a radiation hotbox vaporizer, an igniter, and a catalytic reformer and represents a simplified fuel gasification and reformation approach that provides for rapid start-up (i.e., rapid light-off of the catalytic reactor) and reduces predisposition to coking, especially, with liquid fuels.

The method and apparatus of the present invention can be used in applications where gasification of long chain hydrocarbons is required or desired. Application of the method of this invention will allow pre-vaporization and partial reforming or pre-reforming of diesel fuel into a cleaner gaseous hydrogen reformate prior to downstream processing.

The apparatus of this invention allows reforming or pre-reforming of liquid hydrocarbon fuels without the need for an external pre-heat or complete pre-vaporization. The reactor permits a simplified fuel injection, mixing, and vaporization approach, thereby reducing the predisposition to coking when using such fuels, by taking advantage of a catalytic reaction and rapid mixing within the catalyst bed. One preferred catalytic reformer of this invention comprises a catalytically coated, short-contact-time, ultra-short-channel-length substrate, such as the type disclosed in U.S. Pat. No. 5,051,241, the contents of which are incorporated herein by reference, particularly, the teachings at Column 2, line 47 through Column 4, line 55. One such means is commercially available from Precision Combustion, Inc., North Haven, Conn., USA, as Microlith® brand ultra-short-channel-length metal substrate, described hereinafter. This preferred technology provides the ability to impede soot formation, increases diffusive capabilities to boost mixing, and provides high surface area to augment vaporization.

It has now been found that vaporization of the fuel fed to the nozzle can be accomplished by passing the fuel through a radiation hotbox, that is, through a central inlet tunnel of an outward flow, radial flow exothermic coiled catalytic reactor having an ignition source positioned therein. The liquid fuel and preferred oxidizer, namely air (atomizer air and secondary air), are injected into a tubular center axial flow hot box for vaporization of the fuel droplets before the droplets strike the catalyst bed. A preferred system according to the present invention comprises a cooled fuel injector nozzle, a short-contact-time, ultra-short-channel-length substrate coiled catalytic reactor, and an ignition device (e.g. glow plug). A more preferred embodiment of the present invention comprises the use of a coiled, radial flow, short-contact-time, ultra-short-channel-length substrate catalytic reactor. The advantages of such a configuration are disclosed in U.S. patent application Ser. No. 10/324,464 filed Dec. 19, 2002, now abandoned, but published as corresponding International Patent Application WO-A2-2004/060546, the contents of which are incorporated herein by reference, particularly the teachings at Paragraphs 0014-0031 including FIGS. 1 and 2.

DETAILED DESCRIPTION OF THE INVENTION

This application is a continuation-in-part of U.S. patent application Ser. No. 11/974,988, filed Oct. 16, 2007, which is a continuation in part of U.S. patent application Ser. No. 10/902,512, filed Jul. 29, 2004, now abandoned, which claims the benefit of U.S. Provisional Application No. 60/491,604, filed Jul. 31, 2003. The aforementioned patent applications are incorporated by reference in their entirety into this description.

The fuel supplied to the apparatus and process of this invention comprises any liquid fuel, for example, obtained from a petroleum, biomass, or synthetic source. The fuel is typically a liquid at about 21° C. and 1 atmosphere pressure; and preferably, has a normal boiling point in a range from about 200° C. to about 400° C. Generally, the fuel comprises a mixture of paraffinic, cycloaliphatic, and aromatic hydrocarbons. Suitable fuels include without limitation, diesel, kerosene, and jet propulsion fuels, such as JP-8, JP-5, and Jet A, as well as similar logistic fuels, biodiesel, and fuels obtained from synthetic sources, such as Fisher-Tropsch processes. Preferred fuels include diesel, kerosene, JP-8, JP-5, and Jet A.

The oxidizer supplied to the apparatus and process of this invention comprises any oxidizer capable of reaction in reforming processes. Suitable oxidizers include without limitation air, essentially pure oxygen, oxygen-enriched nitrogen, and oxygen-enriched inert gases, such as oxygen-enriched helium and argon, where the term "oxygen-enriched" refers to a concentration of oxygen greater than about 20 mole percent up to about 99 mole percent. In most applications, oxygen as a constituent of air is a preferred oxidizer. The ratio of the fuel stream to the oxidizer stream fed to the catalytic reformer should be such that there is insufficient amount of oxidizer to completely oxidize all the fuel, that is, the ratio should be fuel-rich.

More particularly, the quantities of oxidizer and fuel fed to the apparatus will depend upon the type of fuel employed. Typically, the quantities are best described in terms of an "O:C ratio," wherein "O" refers to atoms of oxygen in the oxidizer fed into the reformer and "C" refers to atoms of carbon in the liquid fuel fed to the reformer. Generally, the O:C ratio is greater than about 0.5/1 and less than about 1.5/1, the exact range being dependent upon the fuel employed. According to the method of the present invention, the stream containing the oxidizer, e.g., air stream, into which the liquid fuel is atomized, may be at the same temperature or a temperature hotter or colder, as compared with the temperature of the fuel fed to the reformer. Preferably, the oxidizer fed to the catalytic reformer is not pre-heated and is used at about ambient temperature, taken as about 21° C. It was found that heat generated in the radiation hotbox is sufficient to support fuel vaporization at the level required for stable oxidation reactions to proceed throughout the catalyst bed. On the other hand, preheat of the oxidizer may be employed, if desired.

The system and method of the present invention provide gasification of liquid fuel without a requirement for supplying external heat or steam to the gasifier. Fuel and air may be supplied to the gasifier at ambient temperatures; but if desired preheat may be used. This allows a smaller mixing volume (since the catalytic bed tolerates partial unmixedness) and a simpler fuel and air delivery system design. This also allows a means for start-up and initial operation in the absence of heat at the reactor inlet.

Alternatively, an inlet can be provided into the mixing region of the gasification system such that water in the form of liquid or steam may be added to the fuel/oxidizer stream entering the catalyst bed so as to help control the catalyst bed temperature, the degree of fuel conversion in the catalyst, and the exit mixture composition, specifically the quantity of hydrogen ($H_2$) produced. When steam or water is co-fed with the fuel and oxidizer, the process is known as "autothermal reforming" or "ATR". The moles of steam or water fed to the process is best described in terms of a "St:C ratio," wherein "St" refers to the number of moles of steam or water fed to the reactor and "C" refers to number of moles of carbon in the liquid fuel fed to the reactor. Advantageously, the St:C ratio ranges from about 0.8/1 to about 1.3/1, preferably, from about 0.90/1 to about 1.1/1.

The process is advantageously operated at a catalyst bed temperature greater than about 800° C. and less than about 1100° C. Advantageously, the operating pressure ranges from about 0.5 psig (3.5 kPa) to about 70 psig (483 kPa). Preferably, the rate of flow of fuel and oxidizer into the catalyst bed is sufficiently high such that a significant amount of partial oxidation products, namely CO and $H_2$, is formed. When partial oxidation products are formed, as compared with complete or full oxidation, less heat is released resulting in lower catalyst bed temperatures. Preferably, the gas hourly space velocity is greater than about 10,000 liters of combined fuel, oxidizer, and optional steam per liter of catalyst per hour ($10,000\ hr^{-1}$), and more preferably, ranges from greater than about $20,000\ hr^{-1}$, to less than about $250,000\ hr^{-1}$.

The catalytic reformer comprises a reforming catalyst suitable for supporting partial oxidation reactions, wherein a hydrocarbon fuel is reformed to partially-oxidized products including a mixture of carbon monoxide and hydrogen. (In contrast, complete oxidation of the fuel would lead to carbon dioxide and water.) Preferably, the reforming catalyst comprises one or more of the metals of Group VIII of the Periodic Table of the Elements. The Group VIII elements include iron, cobalt, nickel, ruthenium, rhodium, palladium, osmium, iridium, and platinum, and mixtures thereof.

The catalytic reformer further comprises a substrate onto which the catalyst is supported. The substrate preferably provides good mixing for the fuel/oxidizer mixture passing therethrough. This may be best achieved by using porous metal or ceramic substrates, or by using multiple ceramic or metal screens or foams. The most preferred catalyst substrate comprises a metal screen, by which is meant a reticulated net or mesh having a plurality of pores or channels. The metal screen may comprise any metal that can withstand the temperature at which the apparatus is to be operated, preferably, stainless steel or alloys of suitable temperature durability. The metal screen is preferably rolled into a coiled configuration of cylindrical shape having an inner diameter and a larger outer diameter, such that reactants flowing therein move along a radial path from an inlet at the inner diameter to an outlet at the outer diameter. The coiled configuration provides for a plurality of void volumes in random order, that is, empty spaces with essentially no regularity along the flow path from inlet to outlet.

In a most preferred embodiment, the catalyst substrate comprises a Microlith® brand ultra-short-channel-length metal mesh, which is commercially available from Precision Combustion, Inc., North Haven, Conn., USA. A description of the technology can be found, for example, in U.S. Pat. No. 5,051,241, incorporated herein by reference. Generally, the design comprises ultra-short-channel-length, low thermal mass metal monoliths that contrast with prior art monoliths having longer channel lengths. For the purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths of greater than about 5 mm (0.20 inch) upwards of 127 mm (5 inches). The term "channel length" is taken as the distance along a pore or channel measured from an inlet on one side of the substrate to an outlet on the other side of the substrate. In the case of the preferred coiled metal screen, the channel length refers to the short distance from an inlet on one side of the screen to an outlet on the other side of the screen. (The "channel length" of the metal screen is not to be confused with the overall length of the radial flow path from the inlet at the inner diameter of the coiled screen to an outlet at the outer diameter of the coiled screen.) In a most preferred embodiment, the channel length is not longer than the diameter of the metal elements from which the substrate is constructed; thus, the channel length may be in a range from 25 μm (0.001 inch) up to about 100 μm (0.004 inch), and preferably not more than about 350 μm (0.012 inch). In view of the short channel length, the contact time of reactants with the preferred ultra-short-channel-length metal screen advantageously ranges from about 5 msec to about 350 msec. The most preferred Microlith® brand catalyst substrate may typically have from about 100 to about 1,000 or more flow channels per square centimeter. Microlith® brand catalyst substrates may be in the form of woven wire screens, pressed metal screens; or they may be manufactured by perforation and expansion of a thin metal sheet.

The preferred Microlith® brand ultra-short-channel-length metal mesh substrate facilitates packing more active surface area into a smaller volume and provides increased reactive area for a given pressure drop, as compared with prior art monolithic substrates. Whereas in prior art honeycomb monoliths having conventional long channels, a fully developed boundary layer is present over a considerable length of the channels; in contrast, the ultra-short-channel-length characteristic of the preferred metal mesh substrate of this invention avoids boundary layer buildup. Since heat and mass transfer coefficients depend on boundary layer thickness, avoiding boundary layer buildup enhances transport properties. The advantages of employing the ultra-short-channel-length metal substrate, and preferably, the Microlith® brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference.

The deposition of the Group VIII metal(s) onto the metal screen can be implemented by methods well known in the art. Alternatively, finished catalysts comprising Group VIII metal (s) deposited and bound to the preferred Microlith® brand ultra-short-channel-length metal mesh can be purchased commercially from Precision Combustion, Inc., noted hereinabove.

Figure 1:
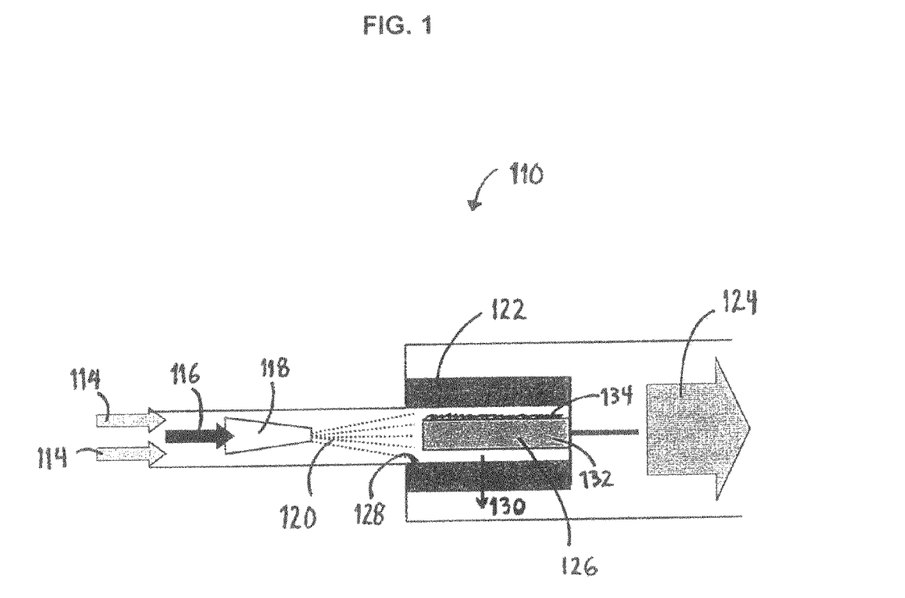
FIG. 1 depicts a schematic representation of an embodiment of a gasification system according to the present invention.

FIG. 1 schematically depicts a gasification system (110) according to the present invention. In this embodiment, catalyst bed (122) defines a cylindrical shape and comprises a wound catalytically coated, short-contact-time, ultra-short-channel-length metal screen substrate. Atomized fuel (120) and airflow (114) enter into the inner diameter (128) of catalyst bed (122) and flow out radially (130) through catalyst bed (122). The igniter (126) in this embodiment comprises an electric glow plug (132) placed inside inner diameter (128) of catalyst bed (122). The glow plug (132) may be coated with catalyst (134) to further assist the start up process. Electric current initially is supplied to glow plug (132) to preheat catalyst bed (122) to the start up temperature. Fuel stream (116) is introduced into injector nozzle (118), and air (114) is then mixed with atomized fuel (120) causing catalyst bed (122) to heat up to the operating temperature at which point the electric current to the glow plug (132) is stopped. Gasified fuel stream (124) exits the system (110).

Figure 2:
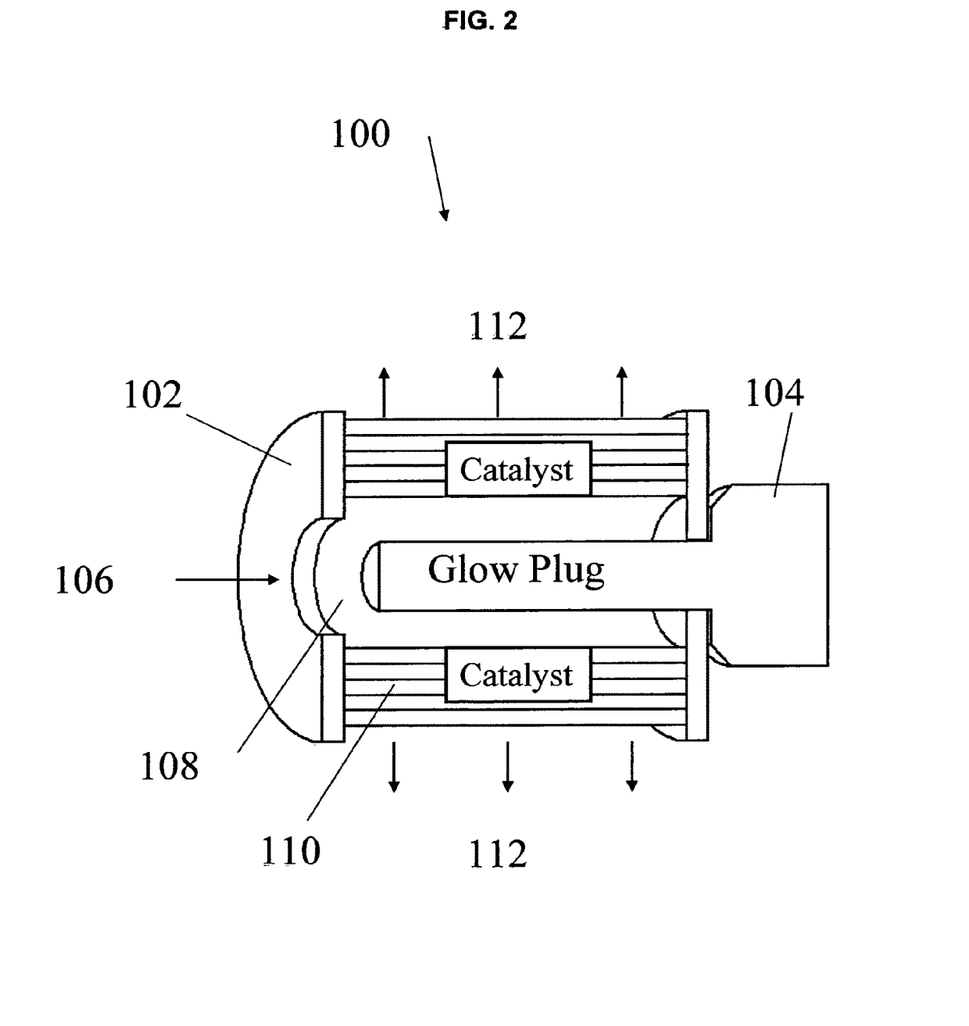
FIG. 2 depicts a cutaway representation of a radiation hot box according to the present invention.

As more simply illustrated in FIG. 2, a radiation hot box chamber (100) according to the present invention comprises a catalytic reactor (102) and an ignition device such as a glow plug (104) positioned inside the reactor. The liquid fuel and air (atomizer air and secondary air) are injected into the tubular center (106) axial flow radiation hot box (108) for vaporization of the fuel droplets before the droplets strike the catalyst bed (110). The reactants (fuel and air) and products (reformate) flow radially from the inner diameter of the catalyst bed (110) to the outer diameter of the catalyst bed (110). Gasified fuel stream (112) exits the catalyst bed (110). A preferred ignition source comprises a ceramic glow plug, which despite its location within the radiation hotbox and its close proximity to the catalytic reactor is sufficiently robust and durable.

Figure 3:
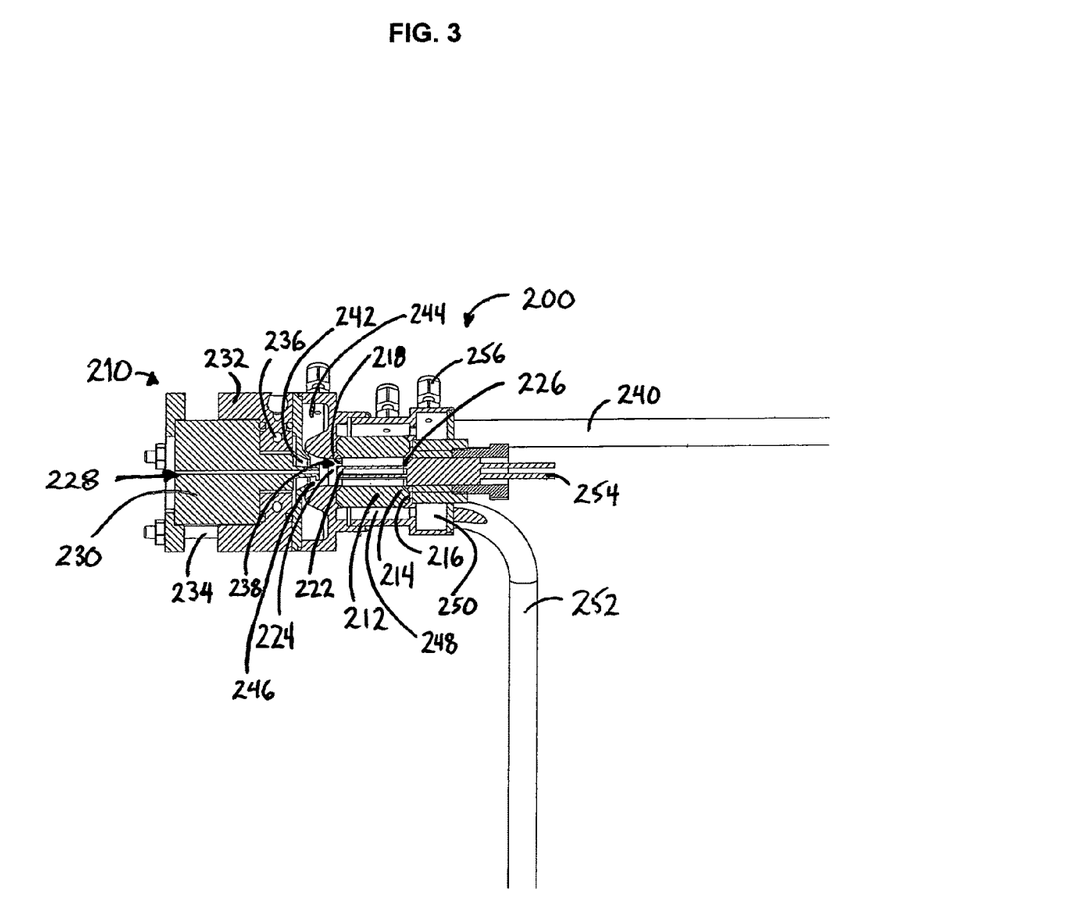
FIG. 3 depicts a detailed design of a gasification system according to the present invention.

FIG. 3 provides a detailed design (200) of an embodiment of a gasification system (210) according to the present invention. In the embodiment shown in FIG. 3, a catalytic reactor (212) is provided comprising a short-contact-time, ultra-short-channel-length substrate wound into a radial flow coiled catalyst bed (214) with an inner diameter of 0.3 inch (0.3" or 7.5 mm) and an outer diameter of 2 inches (2" or 25 mm). The edges (216) of coiled catalyst bed (214) are sealed such as to prevent bypassing of the catalyst bed (214) by the reactants. The flow of reactants enters the inner plenum (218) of catalyst bed (214) and then flows through the bed in radial direction from the inside outward. The inlet fuel/air (and optionally steam) mixture enters inner plenum (218) of catalyst bed (214) from a first side (224). Electrical heating element (222), typically a commercially available glow plug, provides initial pre-heat during the start up of the reactor (212). Glow plug (222) is positioned inside the inner plenum (218) of catalyst bed (214) from a second or opposite side (226) of catalyst bed (214).

Liquid fuel (228) is atomized by fuel nozzle (230), for example an ultrasonic nozzle. Fuel nozzle (230) is fastened to mounting block (232) by any conventional means, for example mounting pins (234). Mounting block (232) can be cooled by any conventional means, for example cooling water passages (236) as shown in FIG. 3. Prior to entering the inner plenum (218) of catalyst bed (214), liquid fuel (228) is injected into air stream (238) provided by a supply source, for example air inlet conduit (240). Steam may be added to air stream (238) if operating in Auto-Thermal Reformer (ATR) mode. Accordingly, the gasification system described herein does not require pre-heat, complete pre-vaporization, or complete premixing of the fuel. Moreover, additional water/air-cooling of fuel nozzle (230) further reduces the coking tendency of the heavy hydrocarbon fuels that tends to occur over hot surfaces. If cooling is used, the preferred amount of cooling is system-design dependent and provides sufficient cooling to keep the fuel nozzle temperature below the point where fuel may start to coke in the presence of radiative heating from the hot catalyst bed. During steady-state operation, a cooling mechanism for the glow plug may also be employed. The cooling system is optional, however, and it not a required component of the system.

Continuing with FIG. 3, atomized fuel is introduced into a reduced mixing and fuel evaporation region. Liquid fuel (228) is metered into fuel nozzle (230) and atomized at fuel nozzle horn (242). Air inlet plenum (244) is in fluid communication with air inlet conduit (240), and air stream (238) enters air inlet plenum (244) and is directed into mixing region (246). A secondary air source, ambient temperature air, is supplied around the fuel nozzle horn (242) for cooling. Glow plug (222) further comprises electrical power leads (254) and is positioned in close proximity to catalytic reactor (212) to enable rapid startup of gasification system (210).

Vaporized and partially oxidized fuel exits catalytic reactor (212) and passes through post reaction chamber (248), exhaust gas plenum (250) and passage (252). The embodiment shown in FIG. 3 also includes instrumentation egress ports (256).

Figure 4:
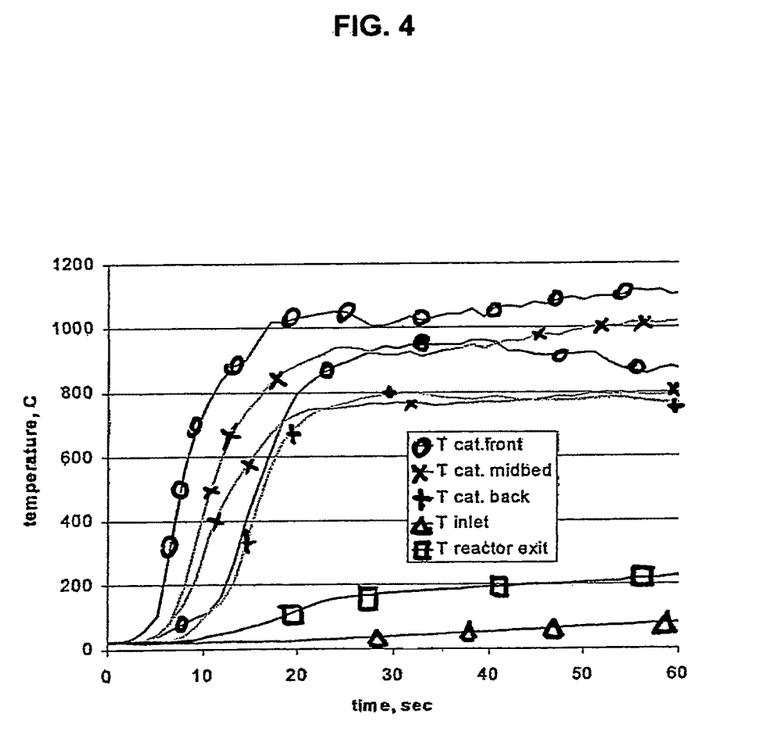
FIG. 4 provides a graphical representation of light-off temperature versus time in the gasification system depicted in FIG. 3.

Results from a startup test of gasification system (210) using liquid fuel JP-8 at fuel feed rate of 5 ml/min is shown in FIG. 4. The reactor components were at room temperature and no heat was provided to the reactor prior to start up. According to the present invention, the reactor was started by energizing the glow plug with a 24V DC source and less than 50 $W_e$. The fuel nozzle was powered and the fuel pump was started with a 1-2 second delay. The glow plug was shut down after the catalyst temperature started to rise. The tests indicated lightoff in about 5 to 10 seconds and the reactor reached steady-state operation in less than 30 seconds, as shown in FIG. 4. The figure also shows the low temperature of the inlet reactant gasses and the hotter temperatures at three locations in the catalyst bed (front, mid-bed, and back) after light-off.

Figure 5:
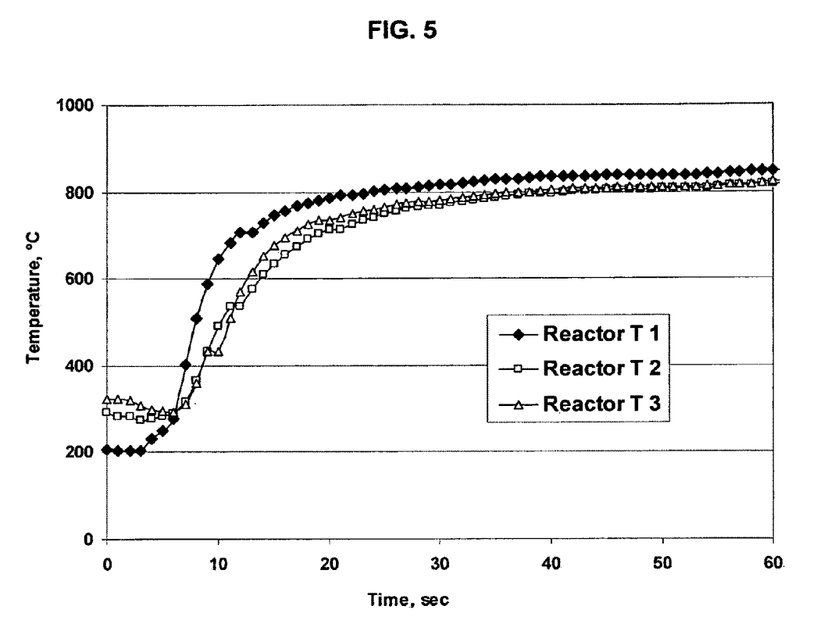
FIG. 5 provides a graphical representation of light-off temperature versus time in the gasification system according to the present invention.

In a like manner, another test of the gasification system of this invention was made using liquid JP-8 fuel. Process conditions were similar to those specified in the previous test with the following additional step. In this example, in addition to using the glow plug, the reactor components were preheated to 300° C. After the fuel pump was started followed by start-up of the air flow, lightoff of the catalyst was observed in 5-10 seconds as evidenced by a steep rise in temperature at three locations in the catalyst bed. Results are shown in FIG. 5.

The preferred O:C ratio at the reactor inlet of a gasification system according to the present invention is fuel dependent. Using dodecane for fuel, gasification system (210) is varied by changing the amount of air provided at the reactor inlet while maintaining a fuel feed rate of 5 ml/min. Room temperature inlet air is used. In this embodiment, the gasified fuel is combusted in a downstream flame and achieving high fuel conversion is not required. Operating the gasifier at an O:C ratio between 0.5 and 0.7 is sufficient for obtaining a stable, soot free flame while providing efficient fuel conversion.

Although the invention has been described in considerable detail, it will be apparent that the invention is applicable to many different catalytic reactions and is capable of numerous modifications and variations, apparent to those skilled in the art, without departing from the spirit and scope of the invention.

The invention claimed is:

1. An apparatus for vaporizing and reforming a liquid fuel, comprising:
   (a) a nozzle configured to atomize and feed a liquid fuel into a mixing region;
   (b) an inlet configured to feed an oxidizer into the mixing region;
   (c) the mixing region being positioned in fluid communication with the nozzle and the inlet for feeding the oxidizer, the mixing region configured to mix the atomized fuel with the oxidizer;
   (d) a radiation hot box for vaporizing the liquid fuel, the radiation hot box being positioned in fluid communication with the mixing region and comprising an ignition source positioned inside a coiled catalytic reactor, wherein the ignition source is not in direct contact with the coiled catalytic reactor;
   (e) the coiled catalytic reactor comprising a coiled metal screen comprising a radial flow path from an inner diameter to an outer diameter of the coiled metal screen and comprising a plurality of void volumes in random order along the flow path from the inner diameter to the outer diameter, wherein the coiled catalytic reactor further comprises a reformer catalyst on at least a portion of the coiled metal screen; and
   (f) an outlet in fluid communication with the coiled catalytic reactor for exiting a gaseous reformate.

2. The apparatus of claim 1 wherein the coiled screen metal comprises an ultra-short-channel-length metal screen having a channel length ranging from 25 microns (μm) (0.001 inch) to 500 μm (0.02 inch).

3. The apparatus of claim 2 wherein the ultra-short-channel-length metal screen has from 100 to about 1,000 channels per square centimeter.

4. The apparatus of claim 1 wherein the catalyst comprises one or more of the metals of Group VIII of the Periodic System of Elements.

5. The apparatus of claim 1 wherein the ignition source comprises a glow plug.

6. The apparatus of claim 1 further comprising an inlet configured to feed water or steam into the mixing region.

* * * * *